United States Patent [19]

Mori

[11] Patent Number: 4,586,592
[45] Date of Patent: May 6, 1986

[54] POWER CHANGE-OVER MECHANISM OF A VEHICLE FOR INDUSTRIAL MACHINERY

[75] Inventor: Mituyoshi Mori, Hirakata, Japan

[73] Assignee: Kabushiki Kaisha Daikin Seisakusho, Japan

[21] Appl. No.: 627,579

[22] Filed: Jul. 3, 1984

[30] Foreign Application Priority Data

Jul. 6, 1983 [JP] Japan ................................ 58-123589

[51] Int. Cl.$^4$ ............................................. F16D 21/08
[52] U.S. Cl. .................................. 192/49; 192/67 A;
74/665 T; 180/247
[58] Field of Search .......................... 74/665 S, 665 T;
180/247; 192/49, 67 A

[56] References Cited

U.S. PATENT DOCUMENTS

| | | | |
|---|---|---|---|
| 2,971,595 | 2/1961 | Fabere et al. | 180/247 |
| 4,040,309 | 8/1977 | Wood et al. | 74/665 T |
| 4,270,409 | 6/1981 | Glaze et al. | 180/247 |

Primary Examiner—Stephen F. Husar
Attorney, Agent, or Firm—Armstrong, Nikaido, Marmelstein & Kubovcik

[57] ABSTRACT

A power change-over mechanism of a vehicle for industrial machinery, in which a power change-over spool is divided into an outer peripheral side member and an inner peripheral side member, the both members are spline connected each other freely movably in the axial direction. An interlocking stopper mechanism defining said axial movement and an urging means are provided, which urges the outer peripheral side member toward the direction of operation at the time when the outer peripheral side member is operated.

8 Claims, 2 Drawing Figures

POWER CHANGE-OVER MECHANISM OF A VEHICLE FOR INDUSTRIAL MACHINERY

BACKGROUND OF THE INVENTION

This invention relates to a power change-over mechanism of a vehicle for industrial machinery, which permits free change-over between four-wheel drive and two-wheel drive.

First, a conventional power change-over mechanism will be described hereunder referring to FIG. 1. A first driving shaft 1 for driving a front wheel and a second driving shaft 2 for driving a rear wheel are both aligned on the same axis center, and at the same time they have outward splines 3, 4 respectively. A high-speed gear 5 and a low-speed gear 6 fit onto the first and second driving shafts 1, 2 through bearings 7, 7a, and at the same time they have inward splines 8, 9 respectively. An annular power change-over spool 10 has a pair of inward splines 11, 12 and a pair of outward splines 13, 14 and at the same time it provides an annular groove 16 for engagement with a shift fork and spline fits onto the first driving shaft 1 freely slidingly operably in the axial direction.

In case of the four-wheel drive, the spool 10 is shifted rearward to interconnect the low-speed gear 6 through the spool 4 to the first and second shafts 1, 2. Namely, a power transmitted from an engine through a transmission to the low-speed gear 6 is transmitted through the splines 9, 14 to the spool 10, and further transmitted from the spool 10 to the first driving shaft 1 through means of the splines 11, 3 and to the second driving shaft 2 through means of the splines 12, 4.

In case of the two-wheel drive, the spool 10 is shifted forward to interconnect the high-speed gear 5 through the spool 10 to the first driving shaft 1. Namely, the power transmitted from the engine through the transmission to the high-speed gear 5 is transmitted through the splines 8, 13 to the spool 10, and further transmitted from the spool 10 to the first driving shaft 1 through means of the splines 11, 3 to drive the front wheel.

However, in case when the power change-over mechanism is composed of the power change-over annular spool 10 as a member, the following disadvantages will arise at the time of change-over. Generally, in case of power change-over, a power from an engine has previously been cut off by means of a clutch etc. and the change-over operation is done with a vehicle stopped. However, in case of change-over from the two-wheel drive to the four-wheel drive, meshing of gears is under fixed condition because of the driving shaft 1 being interconnected to the front wheel and the driving shaft 2 being interconnected to the rear wheel, so that the spline 12 of the spool 10 would not mesh with spline 4 of the driving shaft 2 to make the change-over from the two-wheel drive into the four-wheel drive impossible.

Further, under a normal four-wheel drive operation, a torsion will be produced between the driving shafts 1, 2 due to slippage of wheel and large contact forces will be generated between the spline 3 of the driving shaft 1 and the spline 11 of the spool 10 and between the spline 4 of the driving shaft 2 and the spline 12 of the spool 10, so that the spool 10 would not slide to make the change-over from the four-wheel drive into the two-wheel drive impossible. For this reason, a change-over from a high-speed into a low-speed or a change-over from a low-speed into a high-speed will naturally become impossible.

An object of this invention is to dissolve the above disadvantages, i.e. to enable change-overs between the four-wheel drive and the two-wheel drive and between a high-speed and a low-speed by only operating a set of spools once even when a vehicle is stopping with the splines of the driving shafts for the front and rear wheels being not meshed each other due to deviation of phases thereof, or with a torsion being produced between the driving shafts of the front and rear wheels.

In order to accomplish the above object in this invention, a spool is divided into two members: an outer peripheral side member having splines meshing freely with splines of a high-speed gear and a low-speed gear and an inner peripheral side member having splines meshing freely with splines of a first driving shaft and a second driving shaft, said both members are spline connected each other relatively movably in the axial direction and at the same time an interlocking stopper mechanism defining said axial movement within a prescribed range is equipped, and an urging means is provided, which urges the outer peripheral side member toward the direction of operation at the time when the outer peripheral side member is operated.

DETAILED DESCRIPTION OF THE INVENTION

Figure 1:
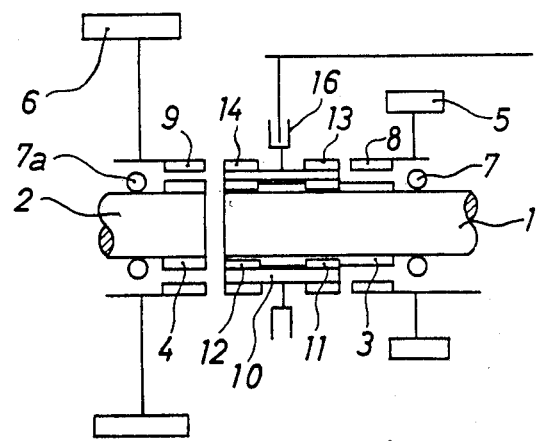
FIG. 1 is a vertical sectional schematic view showing a conventional embodiment.
Figure 2:
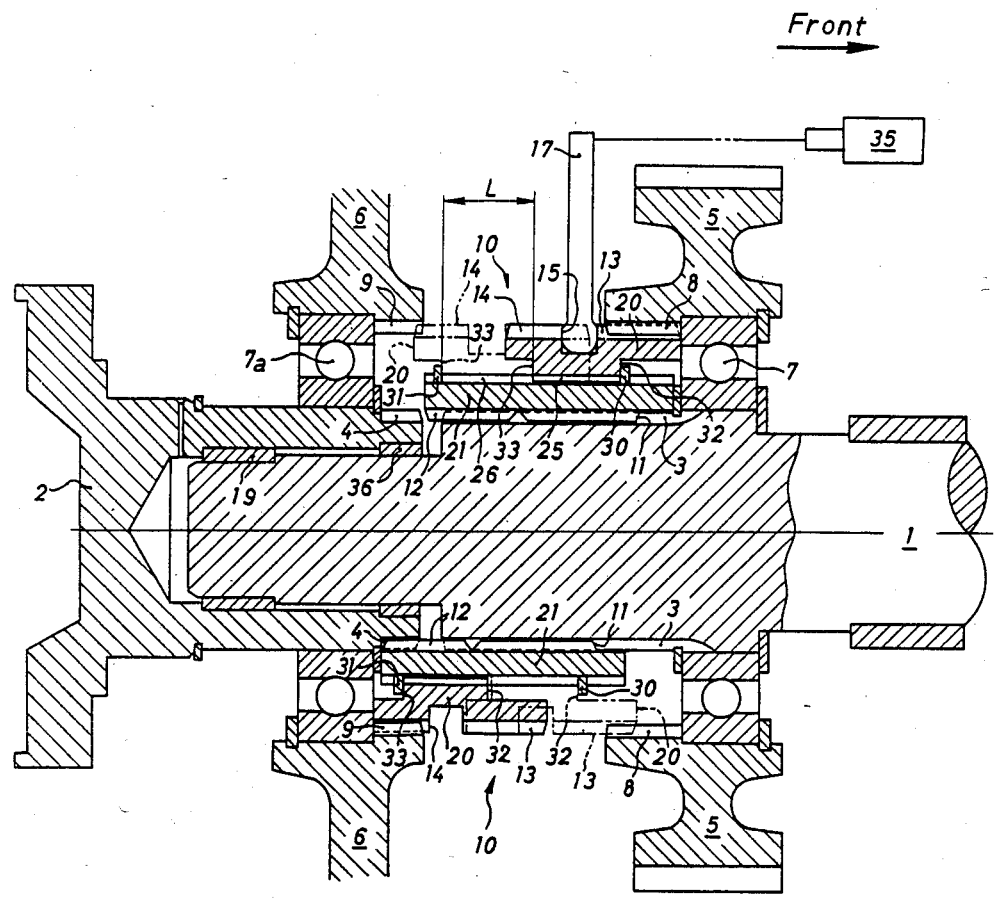
FIG. 2 is a vertical sectional view of a power change-over mechanism according to the present invention.

An upper half of FIG. 2 shows a high-speed two-wheel drive state and a lower half thereof shows a low-speed four-wheel drive state, and a component corresponding to that of said FIG. 1 is attached with the same number as FIG. 1. In this FIG. 2, first and second driving shafts 1, 2 are aligned on the same axis center through aligning bearing metals 19, 36, the first driving shaft 1 is interconnected, for example, to a front wheel at a front side and the second driving shaft 2 is interconnected to a rear wheel at a rear side. A high-speed gear 5 fits freely rotatably onto the first driving shaft 1 through a bearing 7, a low-speed gear 6 fits freely rotatably onto the second driving shaft 2 through a bearing 7a, the both gears 5, 6 mesh with appropriate gears of a transmission (not shown) respectively, thus a power being transmitted from an engine through a clutch etc. Naturally, the high-speed gear 5 rotates at a higher speed than that of the low-speed gear 6.

Outward splines 3, 4 are formed on the first and second driving shafts 1, 2 respectively, and inward splines 8, 9 are formed on bosses of the both gears 5, 6 respectively. The spline 8 of the high-speed gear 5 faces at the spline 3 of the first driving shaft 1 with a space left therebetween and the spline 9 of the low-speed gear 6 faces at the spline 4 of the second driving shaft 2 with a space left therebetween.

A power change-over annular spool 10 disposed between the both gears 5, 6 is divided into an outer peripheral side member 20 and an inner peripheral side member 21, the both members 20, 21 fit each other through splines 25, 26, thus the both members 20, 21 always being able to integrally rotate in the rotational direction and to relatively slide each other in the axial direction.

Splines 13, 14 meshing freely with the splines 8, 9 of the gears 5, 6 are formed on an outer peripheral surface of the outer peripheral side member 20. A spline 11 meshing always with the spline 3 of the first driving shaft 1 and a spline 12 meshing freely with the spline 4 of the second driving shaft 2 are formed on an inner peripheral surface of the inner peripheral side member 21. An annular groove 15 for engaging with a shift fork is formed on the outer peripheral surface of the outer peripheral side member 20, and a shift fork 17 engages with said groove 15 so that the shift fork 17 is able to movably control the outer peripheral side member 20.

A pair of first and second stopper rings 30, 31 are fixed to an outer peripheral surface of the inner peripheral side member 21 with an axial space left therebetween as an interlocking stopper mechanism defining relative axial movement of the member 20, 21. On the contrary, first and second stepped portions 32, 33 facing at the rings 30, 31 axially respectively are formed on an inner peripheral surface of the outer peripheral side member 20. Namely, the outer peripheral side member 20 is so constructed that it can be shifted in relation to the inner peripheral side member 21 within a distance L from a position where the first ring 30 contacts with the first stepped portion 32 to a position where the second ring 31 contacts with the second stepped portion 33.

Said shift fork 17 is interconnected to a pneumatic cylinder 35 serving as an urging means, for instance, which can shift the fork 17 forward or rearward by expanding or contracting the cylinder 35 through means of an appropriate pneumatic changeover mechanism. In case when the outer peripheral side member 20 is movably controlled in the rearward direction, the cylinder 35 is so devised as to keep urging the outer peripheral side member 20 in the rearward direction until the outer peripheral side member 20 reaches the rearmost position (the low-speed four-wheel driving position) as shown by the lower half of FIG. 2. While, in case when the outer peripheral side member 20 is movably controlled in the forward direction, the cylinder 35 is so devised as to keep urging the outer peripheral side member 20 in the forward direction until the outer peripheral side member 20 reaches the foremost position (the high-speed two-wheel driving position) as shown by the upper half of FIG. 2.

Function of the mechanism will be described hereunder. When the entire spool 10 is shifted forward, a front side spline 13 of the outer peripheral side member 20 meshes with the spline 8 of the high-speed gear 5 to enable a power to be transmitted from the high-speed gear 5 only to the first driving shaft 1. Namely, a vehicle becomes able to run on a high-speed two-wheel driving mode.

When the spool is shifted rearward, the rear side spline 14 of the outer peripheral side member 20 meshes with the spline 9 of the low-speed gear 6, and at the same time the spline 11 of the inner peripheral side member 21 meshes with the spline 4 of the second driving shaft 2 to enable the power to be transmitted from the low-speed gear 6 to both the shafts 1, 2. Namely, the vehicle becomes able to run on the low-speed four-wheel driving mode.

Incidentally, power transmission paths under the high-speed two-wheel drive and the low-speed four-wheel drive will be briefly described hereunder. At the time of high-speed two-wheel drive state, the power transmitted from the high-speed gear 5 through the splines 8, 13, the outer peripheral side member 20, splines 25, 26, the inner peripheral side member 21 and the splines 11, 3 to the first driving shaft 1. At the time of low-speed four-wheel drive, the power is transmitted from the low-speed gear 6 through the splines 9, 14, the peripheral side member 20, splines 25, 26, the inner peripheral side member 21, the splines 11, 3 and the splines 11, 4 to the first and second driving shafts 1, 2.

While the vehicle is stopped under the two-wheel driving mode, when a phase difference is generated between the spline 12 of the spool 10 and the spline 4 of the driving shaft 2, a change-over from the high-speed two-wheel drive to the low-speed four-wheel drive is performed as follows. The outer peripheral side member 20 may be shifted rearward from the position shown by the upper half of FIG. 2 and reaches the position where the spline 14 of the outer peripheral side member 20 meshes partially with the spline 9 of the low-speed gear 6 as shown by the ghost line, the second ring 31 contacts with the second stepped portion 33 and the inner peripheral member 21 also begins to move rearward, and the spline 12 of the inner peripheral side member 21 only contacts but does not mesh with a front end edge of the spline 4. Namely, the driving mode is brought into a low-speed two-wheel drive initially. However, at the moment when a phase of the spline 4 coincides with that of the spline 12 after the vehicle starts to move, a rearward urging force of the pneumatic cylinder 35 shifts the both members 20, 21 integrally to the rearmost position as shown by the lower half of FIG. 2 to permit the spline 12 of the inner peripheral side member 21 mesh with the spline 4 of the second driving shaft 2. Namely, the driving mode is automatically brought into the low-speed four-wheel drive.

While the vehicle is stopped under the four-wheel driving mode, when a torsion is produced between the driving shafts 1, 2 due to slippage of wheel etc. to increase a contact pressure between the spline 3 of the driving shaft 1 and the spline 11 of the spool 10 and that between the spline 4 of the driving shaft 2 and the spline 12 of the spool 10, the change-over from the four-wheel drive to the two-wheel drive is performed as follows. The outer peripheral side member 20 is shifted forward from the position shown by the lower half of FIG. 2 and reaches the position where the spline 13 of the outer peripheral side member 20 meshes partially with the spline 8 of the high-speed gear 5 as shown by the ghost line, the first ring 30 contacts with the first stepped portion 32 to stop the forward movement of the outer peripheral side member 20, thus the driving mode being brought into a high-speed four-wheel drive initially. And, at the moment when a load of wheel at the side of the second driving shaft momentarily becomes zero after the vehicle starts to move under the above condition, the both members 20, 21 move to the foremost position as shown by the upper half of FIG. 2 due to a forward urging force of the pneumatic cylinder 35 to automatically change the driving mode into the high-speed two-wheel drive.

Incidentally, a hydraulic cylinder may be used as the urging means in place of the pneumatic cylinder. Further, in case of a power change-over mechanism equipped with a manual lever change-over mechanism, a shift fork and a manual lever may be interconnected together through an urging spring.

In the present invention, the first driving shaft 1 may be used for rear wheel driving and the second driving shaft 2 may be used for front wheel driving. Namely, the vehicle may be driven by a two-rearwheel drive system.

As described above, in this invention, the power changeover annular spool 10 is divided into two members: the outer peripheral side member 20 having splines 13, 14 meshing freely with the splines 8, 9 of the high-speed gear 5 and the low-speed gear 6 and the inner peripheral side member 21 having the splines 11, 12 meshing freely with the splines 3, 4 of the first and second driving shafts 1, 2; said both members are spline connected each other relatively movably in the axial direction and at the same time the interlocking stopper mechanism (rings 30, 31) defining said axial movement within a prescribed range (moving distance L) is equipped, and the urging means (pneumatic cylinder 35) is provided, which urges the outer peripheral side member 20 toward the direction of operation at the time when the outer peripheral side member is operated, so that the following advantages are obtainable.

(1) Even when the vehicle is stopping with the splines 3, 4 of the both driving shafts 1, 2 not meshing each other or with a load applied thereon due to a phase difference produced therebetween, only one-time operation of the outer peripheral side member 20 will provide secure change-over between high-speed and low-speed drives during stopping of the vehicle and between two-wheel and four-wheel drives by means of the urging means when the vehicle begins to move. Namely, the spool 10 offers simple and secure change-over operation.

(2) Since both the change-over operation between high-speed and low-speed drives and that between two-wheel and four-wheel drives can be executed by only the spool 10 constructed as one unit, overall size and manufacturing cost of the change-over mechanism will be minimized.

What is claimed is:

1. A power change-over mechanism of a vehicle for industrial machinery including a first driving shaft and a second driving shaft arranged on the same axis center, a high-speed gear and a low-speed gear fitted in said first and second driving shafts respectively, splines formed on said both shafts and both gears, a power change-over annular spool disposed between the both gears freely slidingly operably in the axial direction, splines formed on said spool, the low-speed gear being interconnected through the spool to the first and second driving shafts when the spool is at a four-wheel drive position, and the high-speed gear being interconnected through the spool to the first driving shaft when the spool is at a two-wheel drive position; characterized in that the spool comprises an outer peripheral side member having splines meshing freely with the splines of said gears, an inner peripheral side member having splines meshing freely with the splines of said driving shafts, said outer peripheral and said inner peripheral side members are spline connected to each other and are relatively movably in the axial direction and at the same time, and a stopper mechanism limiting said axial movement within a prescribed range, and that said power change-over mechanism further includes an urging means for moving the outer peripheral side member in a desired direction of operation to obtain said drive positions.

2. A power change-over mechanism of a vehicle for industrial machinery as set forth in claim 1, in which a pair of stopper rings serving as a stopper mechanism are fixed at predetermined axial locations on an outer peripheral surface of the inner peripheral side member with a space provided therebetween in the axial direction, and recessed portions are formed on an inner peripheral surface of the outer peripheral side member to accommodate said rings.

3. A power change-over mechanism of a vehicle for industrial machinery as set forth in claim 1, in which a pneumatic cylinder is used as the urging means.

4. A power change-over mechanism of a vehicle for industrial machinery as set forth in claim 1, in which a pair of stopper rings serving as a stopper mechanism are fixed at predetermined axial locations on an outer peripheral surface of the inner peripheral side member with a space provided therebetween in the axial direction limiting axial movement within a prescribed range, recessed portions are formed on an inner peripheral surface of the outer peripheral side member to accommodate said rings, and a pneumatic cylinder is used as the urging means.

5. A power change-over mechanism of a vehicle for industrial machinery as set forth in claim 4, in which a shift fork is engaged with an annular groove of the outer peripheral side member, said shift fork being interconnected with the pneumatic cylinder.

6. A power change-over mechanism of a vehicle for industrial machinery as set forth in any one of claim 1 to claim 5, in which the second driving shaft is formed into a cylindrical shape, the second driving shaft being fitted onto an outer periphery of a reduced diameter end portion of the first driving shaft through a bearing.

7. A power change-over mechanism of a vehicle for industrial machinery as set forth in any one of claim 1 to claim 5, in which the first driving shaft is used for a front-wheel driving shaft and the second driving shaft is used for a rear-wheel driving shaft.

8. A power change-over mechanism of a vehicle for industrial machinery as set forth in claim 6, in which the first driving shaft is used for a front-wheel driving shaft and the second driving shaft is used for a rear-wheel driving shaft.

* * * * *